Patented Dec. 21, 1943

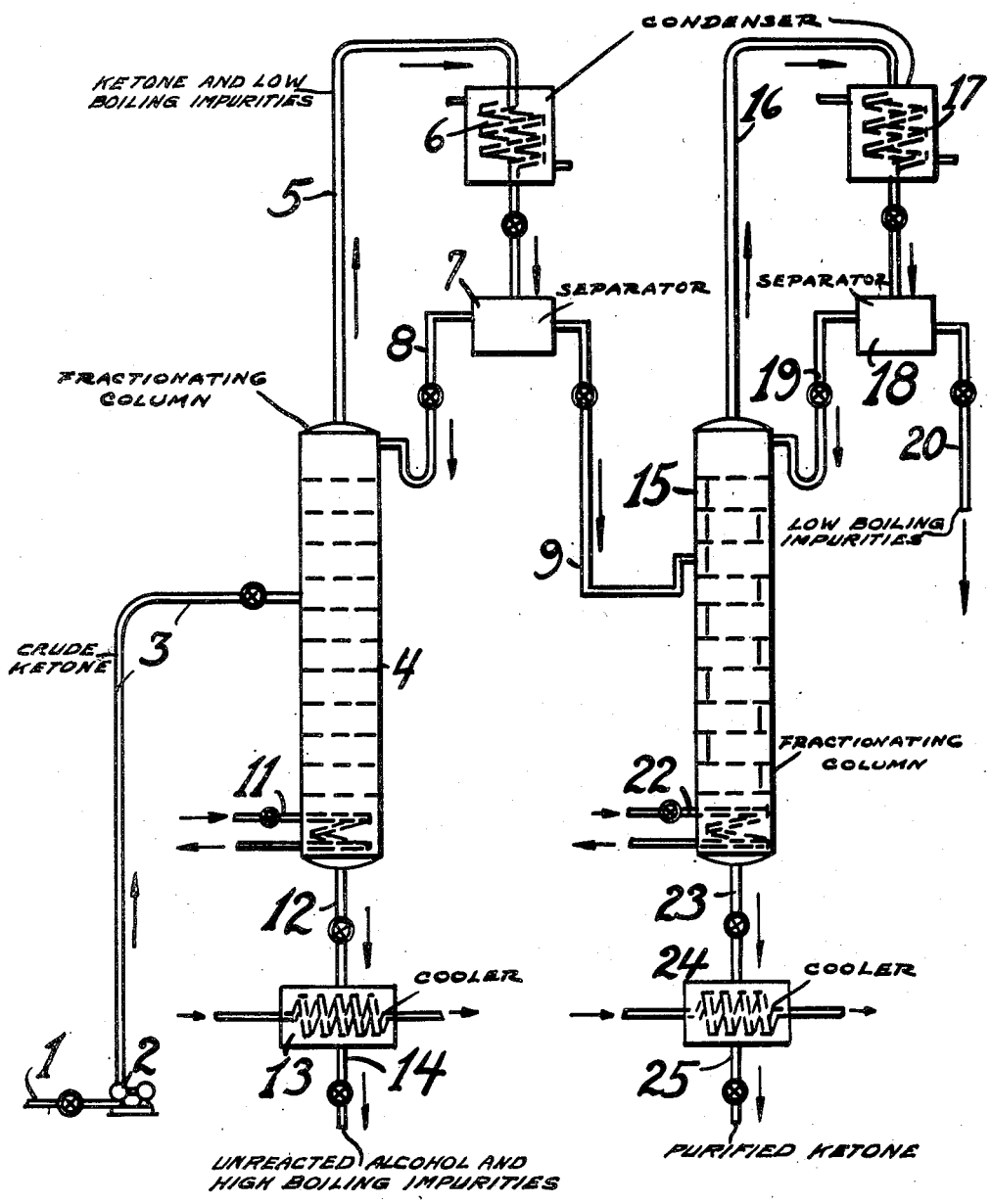

2,337,489

UNITED STATES PATENT OFFICE 2,337,489

PURIFICATION OF KETONES

John A. Patterson, Westfield, N. J., assignor to Standard Oil Development Company, a corporation of Delaware Application December 17, 1940, Serial No. 370,454

2 Claims. (Cl. 202—40)

This invention relates to the preparation of ketones in a high degree of purity and in high yields from crude supplies, and more particularly to the purification of methyl ethyl ketone.

Ketones are usually prepared from secondary alcohols by passing the alcohol at an elevated temperature over a dehydrogenation catalyst according to the rationale,

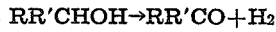

$$RR'CHOH \rightarrow RR'CO + H_2$$

When the difficultly reducible oxides such as those of manganese, chromium, zinc, magnesium and cerium are used as catalysts in this reaction either alone or in admixture with alkaline earth oxides and inert binders, temperatures from 650° F. to 750° F. are employed, while when catalysts are of the metal type such as of copper or brass, temperatures from 900° F. to 1000° F. are employed. In some cases ketones are prepared from the alcohols by cracking treatment at high temperatures. Ketones may also be prepared from the reactive acid liquor formed by treating with a polybasic acid, particularly sulphuric acid of about 1.7 specific gravity; the complex mixtures containing unsaturates obtained in the refining of petroleum and shale oil distillates. Whatever may be the method of preparation, these ketone products necessarily contain many types of impurities. For uses of the ketones such as for solvents and the preparation of resins, a material of high degree of purity is essential. This invention is concerned with the preparation of highly purified ketones from the ketone products obtained by any of the above processes.

The better methods by which the ketones are prepared give yields in which the ketones are present in amounts between about 30 and 80% concentration. The nature of the impurities and proportions in which they occur depend upon the particular ketone prepared, and upon the method and conditions of processing. The more common types of impurities are water, unreacted alcohols, aldehydes, ethers and highly polymerized hydrocarbon material. The separation of the impurities has, in the past, been made largely by fractional distillation methods, but solvent extraction and salting-out methods have also been used to some extent. Indeed, solvent extraction methods have been used together with distillation when the amount of unreacted alcohol is high, because distillation in such cases involves the use of large fractionating columns and/or high reflux ratios and hence high heat consumption.

In effecting the recovery of ketones from the crude supplies obtained by processes involving the controlled oxidation and/or dehydrogenation, especially dehydrogenation, of secondary alcohols, prolonged heating of the mixtures must be particularly avoided. The products of these reactions other than the ketones besides adding to the volume of material from which the ketones have to be separated, have a deleterious effect upon the color and odor of the ketone material; these effects are more pronounced when the mixtures are subjected to heat. When the reaction mixtures are heated many of the high boiling compounds decompose to give products which distill within the boiling range of the desired ketones, and these products exert more harmful effects upon the color and odor of the ketone material than the parent compounds. The products of the thermal decomposition of the higher boiling compounds of the reaction mixtures are also more difficult to eliminate in a purification procedure. Indeed, in many cases, a combination of methods has to be undertaken in order to extract these materials.

In the procedure of the present invention, the ketone, in a relatively pure state, is separated from the impure mixture in the initial stages of the purification treatment. In this way, the ketone material is removed with the lighter fractions from the mixture. Thus the distillation of the ketone from the impure material is effected at a lower temperature than even the boiling point of the ketone, and the minimum quantity of material has thus to be handled in the second stage of the purification treatment. As a result of the low temperatures employed in separating the ketone material in the initial stages of the purification, less decomposition of the high boiling material occurs and therefore less compounds exerting a harmful effect upon the stability of the ketone material are present in the product of this first stage of the purification treatment. Further processing of the ketone material involves a second distillation in which the lower boiling impurities are separated from the ketone. In order to effect close fractionations in both of the distillations, the heat supplies and the reflux ratios in the two columns in which the distillations are effected, are carefully controlled. Thus the process of the invention dispenses with the need of employing solvent extraction at any stage of the purification and the distillations are effected in columns smaller than those usually employed in prior art procedure involving distillation alone. Also, as an added feature, the heat consumption to effect purification is less than in prior art procedures involving distillation alone.

The procedure in the invention may be carried out by feeding the impure ketone into about the middle of a primary fractionating column. The ketone, as vapor, is thus separated from the unreacted alcohols and higher boiling reaction products. With the ketone also pass over, as vapor, a small percentage of the lower boiling compounds which include water, with which all the ketones except acetone form a minimum boiling mixture. In addition to unreacted alcohol, the distillation residue in the first column contains deterioration products of the reaction which may be higher alcohols, higher ketones, ethers, aldehydes, hydrocarbons or other materials, depending on the alcohol from which the ketone is prepared. The desired ketone is therefore separated from these higher boiling compounds with the minimum of heat, and contamination is avoided with these materials. Moreover, due to the low temperature of distillation, substantially no decomposition products are formed in the column during the separation of the desired ketone, and therefore no bad colors and odors occur in the ketone material. This relatively pure ketone is taken overhead and is partially condensed. A portion of this condensate is returned to the column and the remaining portion is passed to the second fractionating column. In the second column, the compounds having a lower boiling point than the ketones, are separated as overhead and the purified ketone remains as the distillation residue. The overhead material from this column, containing only a small amount of ketone, is usually discarded but it may be treated separately for the recovery of ketone.

In the drawing a diagrammatic view of suitable form of apparatus for effecting the process of the invention is shown.

The crude ketone supply entering through pipe 1 is fed through pipe 3 by means of pump 2 into about the middle of the fractionating column 4, which is preferably of the bubble plate type. Heat is supplied to this column by means of the steam coil 11. The vapor overhead, consisting of ketone freed of alcohol and high boiling impurities, is conducted through pipe 5 to condenser 6. The condensate from 6 is separated by suitable means at 7 and portion supplied as reflux to the column 5 by means of the pipe 8. The reflux ratio maintained in colum 4 is usually of the order of about 4 to 1. The remaining portion of the condensate is conducted through pipe 9 to column 15 of the fractionating bubble plate type for further purification. The condenser 6 may be a partial condenser in which case a considerable portion of the heat required to separate the low boiling impurities in column 15 is supplied by the uncondensed vapor leaving 6. This use of the condenser 6 as a partial condenser functions as an additional plate in the column 4, thus increasing the degree of fractionation of the ketone material from the higher boiling materials in column 4.

Heat is supplied to column 15 by means of a steam coil or suitable heating device 22. The distillate from this column, which consists of low boiling impurities and some ketone, is conducted through pipe 16 to condenser 17. The condensate from 17 is separated by suitable means at 18, portion being supplied as reflux to the column 15 by means of the pipe 19. The reflux ratio maintained in column 15 is usually in excess of 50 to 1, and when the condenser 6 is employed as a partial condenser, reflux ratios up to 400 to 1 may be employed without involving high heat consumption. Thus when the condenser 6 is employed as a partial condenser, the column 15 may function more in the nature of a fractional condenser than as a fractional distillating column. The remaining portion of the condensate is passed through pipe 20, either to be discarded or for subsequent treatment for recovery of the ketone. The purified ketone is passed through a line 23 to the cooler 24 and by pipe 25 to storage.

The bottoms in column 4, which consist of unreacted alcohol and high boiling impurities essentially free of ketone, are removed through pipe 12 and cooler 13 and then either recycled directly to the ketone preparation unit or by pipe 14 to storage. This material may then be subsequently distilled to separate the unreacted alcohol and the alcohol used for the preparation of further quantities of ketones.

The use of this system for the purification of methyl ethyl ketone produced by the dehydrogenation of secondary butyl alcohol will be described to illustrate functioning of the system. Analysis of a typical crude supply is as follows:

|  | Per cent |
|---|---|
| Methyl ethyl ketone | 75.00 |
| Secondary butyl alcohol | 24.00 |
| Secondary butyl ether | 0.10 |
| High boiling impurities | 0.05 |
| Low boiling impurities | 0.85 |

The high boiling impurities in this mixture consist of olefines, sec-octyl alcohols, the corresponding ketones, and the condensation products of the ketones with the olefines. The lower boiling impurities consist largely of water, acetaldehyde, acetone and the lower olefines. A crude supply of about this composition is fed through pipes 1 and 3 into an intermediate plate of column 4. Heat is supplied by means of a closed steam coil. The temperature at the top of the column is maintained at 79.5° C., while at the bottom the temperature of 99.5° C. is maintained. The overhead material is conducted through pipe 5 to the condenser 6. A portion of the condensate is refluxed to the column 4 through the pipe 8. A reflux ratio of approximately 4 to 1 is maintained in column 4. The remaining portion of the condensate is conducted onto an intermediate plate of column 15 through pipe 9. Upon the basis of the above analysis given for crude supply, the stream to column 15 has the analysis of

|  | Per cent |
|---|---|
| Methyl ethyl ketone | 98.9 |
| Low boiling impurities | 1.1 | and the distillation residue in column 4

|  | Per cent |
|---|---|
| Secondary butyl alcohol | 99.4 |
| Secondary butyl ether | 0.4 |
| High boiling impurities | 0.2 |

In column 15 a reflux ratio of at least 50 to 1 is maintained and heat was supplied by means of a close steam coil 22. The temperature at the top of the column is maintained at 65° C., while at the base of the column the temperature is held at 80° C. The vapors are withdrawn through pipe 16 and pass into condenser 17. Part of the condensate is employed as reflux through line 19. The overhead product from this column which is withdrawn through line 20, has the composition of

| | Per cent |
|---|---|
| Low boiling impurities | 75.0 |
| Methyl ethyl ketone | 25.0 |

The distillation residue from the column consists of methyl ethyl ketone of 99.8% purity. This ketone material has a water-clear color and is of good odor and is without content of any compounds which cause a degradation of either color or odor. Furthermore, the ketone so purified is not affected by prolonged storage in iron vessels. The odor resulting from decomposition of products, especially the secondary ethers, is completely removed in the above processing. The purification of methyl propyl ketone (B. P. 102° C.) follows the above processing with only slight changes in the temperature in the distillation units.

Since all the ketones which may be purified by this method with the exception of acetone, form with water binary constant boiling mixtures, water occurring as an impurity will be removed with the lower boiling impurities as overhead from the column 15. In the case of acetone, since no minimum boiling mixture is formed with water, the water present as impurity is retained with the isopropyl alcohol and higher boiling impurities in column 4 as the distillation residue. In the purification of acetone the temperatures maintained in the column 4 are at the top 56° C. and the bottom 82° C. respectively. The overhead from column 15 under such circumstances, consists largely of aldehydes, ethers and low boiling impurities in an anhydrous condition. The temperatures in column 15 are controlled to maintain 48° C. at the top and 56.5° C. at the bottom, respectively.

Other means of applying the principle of this invention may be employed instead of those given, change being made as to the particular methods described therein, provided the step or steps stated by any of the following claims or the equivalents of such stated step or steps be employed.

What is claimed is:

1. Process of preparing highly purified methyl ethyl ketone from an impure mixture obtained in the dehydrogenation of secondary butyl alcohol, which comprises distilling in a fractionating column said mixture to separate as vapor at a temperature of 79.5° C. methyl ethyl ketone together with associated low boiling impurities, partially condensing the vapors so formed, returning portion of the condensed material as reflux to the fractionating column, passing the remaining portion of the distillate material to a second fractionating column, heating the material therein to a temperature of about 80° C. under reflux to remove substantially all the lower boiling compounds as distillate from the methyl ethyl ketone.

2. A process of preparing a highly purified ketone from an impure mixture obtained in the preparation of a ketone from the corresponding secondary alcohol, and containing small quantities of resultant impurities some of which are chemically unstable and others of which have poor colors and odors which comprises distilling in a fractionating column said mixture to separate as vapor the ketone together with the associated low-boiling impurities at a temperature below the boiling point of the pure ketone, partially condensing the vapors so formed, returning portion of the condensed material as reflux to the fractionating column, passing the remaining portion of the distillate material to a second fractionating column, heating the material therein to a temperature at the boiling point of the pure ketone under reflux to remove substantially all of the lower boiling compounds as distillate from the ketone.

JOHN A. PATTERSON.